(12) United States Patent
Itaya et al.

(10) Patent No.: US 7,901,264 B2
(45) Date of Patent: Mar. 8, 2011

(54) PROCESS FOR PRODUCING DOUBLE HELICAL GLASS TUBE, LIGHT-EMITTING TUBE FOR FLUORESCENT LAMP, AND FLUORESCENT LAMP

(75) Inventors: Kenji Itaya, Osaka (JP); Kenji Nakano, Kyoto (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 11/909,065

(22) PCT Filed: Mar. 28, 2006

(86) PCT No.: PCT/JP2006/306216
§ 371 (c)(1),
(2), (4) Date: Sep. 18, 2007

(87) PCT Pub. No.: WO2006/106645
PCT Pub. Date: Oct. 12, 2006

(65) Prior Publication Data
US 2009/0021135 A1 Jan. 22, 2009

(30) Foreign Application Priority Data

Apr. 1, 2005 (JP) .................................. 2005-106022

(51) Int. Cl.
*H01J 9/00* (2006.01)
(52) U.S. Cl. ............................................ 445/26; 65/110
(58) Field of Classification Search .............. 65/64, 86, 65/109, 110, 281; 445/26, 20, 22; 313/318.01–318.12, 484–493, 623, 624
See application file for complete search history.

(56) References Cited

U.S. PATENT DOCUMENTS

| 4,830,648 | A | * | 5/1989 | Klein et al. ....................... 65/54 |
| 6,560,995 | B2 | | 5/2003 | Oga et al. |
| 6,744,205 | B2 | | 6/2004 | Iida et al. |
| 2001/0007197 | A1 | * | 7/2001 | Oga et al. ....................... 65/109 |
| 2002/0180352 | A1 | * | 12/2002 | Ilyes et al. ..................... 313/573 |
| 2004/0231365 | A1 | * | 11/2004 | Yabuki et al. ................... 65/110 |

FOREIGN PATENT DOCUMENTS

| CN | 2609171 Y | 3/2004 |
| JP | 2001-185032 | 7/2001 |
| JP | 2002-15701 | 1/2002 |
| JP | 2003-173760 | 6/2003 |
| JP | 2004-87397 | 3/2004 |
| JP | 2004-311032 | 11/2004 |

OTHER PUBLICATIONS

Machine Tanslation of JP 2004-087397.*

* cited by examiner

*Primary Examiner* — Joseph L Williams
*Assistant Examiner* — Andrew J Coughlin (57) ABSTRACT

A manufacturing method of a double spiral glass tube having a bump that is difficult to break. The manufacturing method includes the steps of: causing the bump forming section (32) in the central portion (13) to have greater tube thickness than the other sections in the glass tube (23) that has been deformed into a double spiral shape; heating and softening part of the bump forming section; and forming a bump (14) by injecting a nitrogen gas (27) into the inner space of the glass tube from both ends thereof to expand the bump forming section. With this structure, the bump forming section is preliminarily formed to have a greater tube thickness than the other sections. As a result, the bump, which is formed by expanding the bump forming section to have a smaller tube thickness than before the expansion, still maintains a sufficient strength.

15 Claims, 10 Drawing Sheets

PROCESS FOR PRODUCING DOUBLE HELICAL GLASS TUBE, LIGHT-EMITTING TUBE FOR FLUORESCENT LAMP, AND FLUORESCENT LAMP

TECHNICAL FIELD

The present invention relates to a manufacturing method of a double spiral glass tube, a fluorescent lamp arc tube, and a fluorescent lamp.

BACKGROUND ART

With the advent of an energy saving era, electric bulb type fluorescent lamps and compact type fluorescent lamps are becoming prevalent as energy saving light sources for replacing general electric bulbs in the field of lighting.

Conventionally, there have been efforts to produce smaller-scale electric bulb type fluorescent lamps with the same outer shape as general incandescent light bulbs. In recent years, double spiral glass tubes have been applied to the arc tubes for such fluorescent lamps since they have advantages for producing smaller scale lamps.

Such a double spiral glass tube is formed by bending a glass tube at a central portion thereof, and winding the two portions of the glass tube, which extend from the central portion, around a spiral axis. After this, a pair of electrode assemblies are attached to both ends of the glass tube, respectively, to hermetically seal the glass tube. Mercury and a buffer rare gas such as argon are then hermetically inserted into the inner space of the glass tube. A phosphor is preliminarily applied to the inner wall of the glass tube. As the phosphor is excited by ultraviolet light emitted from mercury atoms, visible light is emitted from the arc tube. The typical measurement of the glass tube is, for example, as follows in the case of a 22 W fluorescent lamp for replacing a general 100 W electric bulb: a tube inner diameter di is 7.2 mm, and a tube thickness t is 0.9 mm. Here, in general, a glass tube whose thickness is in a range from 0.7 mm to 1.2 mm is used for the arc tube of the electric bulb type fluorescent lamp, when the tube inner diameter di is in a range from 5.0 mm to 10.0 mm. Important factors for determining the measurement are, especially, the easiness in performing the forming process and the mechanical strength.

The electric bulb type fluorescent lamp is completed as a final product when the arc tube is housed in an outer glass bulb, and a base is attached to an assembly of an electronic ballast with the outer glass bulb containing the arc tube.

Meanwhile, it is well known that the lamp efficiency of a general fluorescent lamp depends on the mercury vapor pressure inside the tube, where the mercury vapor pressure is uniquely defined by temperature Tc at the coldest point portion Sc of the arc tube, and that the best lamp efficiency is obtained when the temperature Tc is in the most appropriate range of 55° C. to 65° C. when the tube inner diameter di is in the range from 5.0 mm to 10.0 mm. Also, in general, when an ordinary electric bulb type fluorescent lamp is lighted constantly, the coldest point temperature Tc of the arc tube housed in the outer glass bulb becomes higher than the most appropriate range.

In producing some actually sold electric bulb type fluorescent lamps to which the double spiral glass tube has been applied, the central portion at which the glass tube is bent is expanded (see Document 1, for example), a bump projecting from the central portion is formed, and the coldest point portion Sc is set at the bump. Further, there is known a method having been developed and introduced, in which the coldest point portion Sc is connected with the outer glass bulb by silicone resin being a thermal conductor so that the portion can be cooled. This method enables the coldest point temperature Tc at the coldest point portion Sc to be reduced to the most appropriate range that provides the best lamp efficiency.

The bump of the double spiral glass tube is formed as follows, for example. First, a bump forming section within the central portion of the glass tube is heated using a gas burner to become softened, and a gas is injected into the glass tube to expand a portion around the softened bump forming section (see Document 2, for example).

Document 1: Japanese Patent Application Publication No. 2003-173760
Document 2: Japanese Patent Application Publication No. 2004-87397

DISCLOSURE OF THE INVENTION

The Problems the Invention is Going to Solve

However, when the inventors of the present invention set to mass-produce the electric bulb type fluorescent lamp to which the double spiral glass tube is applied, by adopting the above-described conventional method for forming the bump at the central portion of glass tube, it was found that the bump, which is formed at the central portion of the double spiral glass tube, is easy to break during the manufacturing process of the mass-produced lamp. More specifically, in the lamp manufacturing process with use of the double spiral glass tube, the bump breakage occurrence rate reached approximately 3% at the largest, which is not a negligible level.

The object of the present invention is therefore to provide a method for producing a double spiral glass tube that is difficult to break compared with conventional ones, while maintaining a conventional level of effectively cooling the coldest point at the bump, and to provide an arc tube for a fluorescent lamp, and a fluorescent lamp.

Means to Solve the Problems

The object of the present invention is fulfilled by a manufacturing method of a double spiral glass tube, comprising: a deforming step of softening and bending a straight glass tube at a central portion thereof and deforming the glass tube into a double spiral shape; a processing step of processing the double spiral shaped glass tube so that a bump forming section in the central portion has a greater tube thickness than other sections in the central portion, the bump forming section being a section at which a bump is to be formed; and a forming step of forming the bump by expanding the bump forming section.

In the above-described manufacturing method, the processing step may include: an injecting sub-step of injecting a gas into the double spiral shaped glass tube from an end thereof while the glass tube is in a softened state; and an expansion restriction jig setting sub-step of setting an expansion restriction jig in a predetermined position, at which the expansion restriction jig is to be contacted with the bump forming section when the central portion is expanded by the injection of the gas in the injecting sub-step, so that an amount of expansion in the bump forming section is smaller than an amount of expansion in the other sections of the central portion.

In the above-described manufacturing method, a portion of the expansion restriction jig that is to be contacted with the bump forming section may be flat.

In the above-described manufacturing method, the processing step may further include: a shaping jig setting sub-step of setting a shaping jig that adjusts a shape of a spiral portion excluding the central portion of the double spiral shaped glass tube when the gas is injected in the injecting sub-step.

In the above-described manufacturing method, the expansion restriction jig may be attached to the shaping jig.

The object of the present invention is also fulfilled by a manufacturing method of a double spiral glass tube, comprising: a deforming step of softening and bending a straight glass tube at a central portion thereof and deforming the glass tube into a double spiral shape; and a processing step of processing the double spiral shaped glass tube so that a furthest section in the central portion has a greater tube thickness than other sections in the central portion, the furthest section being furthest from two ends of the glass tube in respective straight lines.

The object of the present invention is also fulfilled by a fluorescent lamp arc tube, wherein a double spiral shaped glass tube has been processed such that a bump forming section in a central portion of the glass tube has a greater tube thickness than other sections in the central portion, the bump forming section being a section at which a bump is to be formed, the bump has been formed at the bump forming section by expanding the bump forming section, and the glass tube is at least 0.1 mm in thickness at the bump.

The object of the present invention is also fulfilled by a fluorescent lamp arc tube, wherein a furthest section in a central portion of the glass tube has a greater tube thickness than other sections in the central portion, the furthest section being furthest from two ends of the glass tube in respective straight lines.

The object of the present invention is also fulfilled by a fluorescent lamp comprising the fluorescent lamp arc tube defined above.

EFFECTS OF THE INVENTION

The inventors of the present invention found out through analysis that the problem of easy breakage of the bump is attributed to the reduction of the mechanical strength thereof due to the smaller tube thickness thereof than the other sections. Namely, the bump is formed by expanding the bump forming section. This inevitably reduces the tube thickness of the bump to be smaller than the other sections, and makes the bump relatively easy to break.

With the structure recited in claim 1, the bump forming section is processed to have a greater tube thickness than the other sections, causing the bump to have a great tube thickness, compared with bumps formed by conventional methods which do not process the bump forming section to have a greater tube thickness than the other sections. This improves the mechanical strength of the bump, and thus makes the bump more difficult to break than the bumps formed by conventional methods.

With the structure recited in Claim 2, the amount of expansion in the bump forming section is made smaller than the amount of expansion in the other sections of the central portion. As a result of this, the glass material of the bump forming section that would have expanded if not for the restriction becomes a block having a great thickness. This results in the bump forming section having a greater tube thickness than the other sections in the central portion.

With the structure recited in claim 3 where the contacting portion of the expansion restriction jig is flat, the contacting portion is contacted with a smaller area of the glass tube than in the case where the contacting portion is not flat. This structure therefore makes it possible to cause selectively only the bump forming section to have a great tube thickness.

With the structure recited in claim 4, it is further possible to adjust the spiral portion of the double spiral shaped glass tube.

With the structure recited in claim 5, it is possible to perform, in the same step, the process of adjusting the shape of the spiral portion and the process of causing the bump forming section to have a greater tube thickness. Accordingly, this makes it possible to avoid additionally performing a work step which requires the expansion restriction jig to be set.

The inventors of the present invention also found a problem in manufacturing an electric bulb type fluorescent lamp to which a double spiral glass tube without a bump is applied. The problem is that a furthest section in the central portion, which is furthest from two ends of the double spiral glass tube in respective straight lines, is easy to break during the manufacturing process. The problem lies in the structure of the lamp having been assembled where the end portion of the lamp becomes the furthest section, with a highest possibility that the end portion of the glass tube is broken when it is shook or dropped during transportation or the like.

With the structure recited in claim 6, the furthest section is processed to have a greater tube thickness than the other sections. This improves the mechanical strength of the furthest section, and thus makes the furthest section more difficult to break than the furthest section formed by conventional methods.

The inventors of the present invention studied the structure of the arc tube that effectively restricts the breakage of the bump. As a result of the study, the inventors found that it is preferable to set the bump to have a tube thickness of 0.10 mm or greater. With this value, it is possible to restrict the breakage occurrence rate in the bump manufacturing step to 0.01% or lower, a level where there is no problem in the actuality. For information, the breakage occurrence rate of 0.01% is a level that has already been achieved conventionally in manufacturing arc tubes, such as U-letter-shaped arc tubes, other than the double spiral glass tubes. Namely, the structure recited in claim 7 makes it possible to decrease the breakage occurrence rate to such a level that has already been achieved conventionally.

With the structure recited in claim 8, the furthest section is processed to have a greater tube thickness than the other sections. This improves the mechanical strength of the furthest section, and thus makes the furthest section more difficult to break than the furthest section formed by conventional methods.

With the structure recited in claim 9, it is possible to provide a lamp having a small breakage occurrence rate in the manufacturing process or the transportation process.

DESCRIPTION OF CHARACTERS 1 arc tube
2 glass tube
12 spiral portion
13 central portion
14 bump
15 electric bulb type fluorescent lamp
23 glass tube
31 expansion restriction jig
32 bump forming section
34 furthest section

BEST MODE FOR CARRYING OUT THE INVENTION

The best mode for carrying out the invention will be described in the following with reference to the attached drawings.
<Structure>

Figure 1:
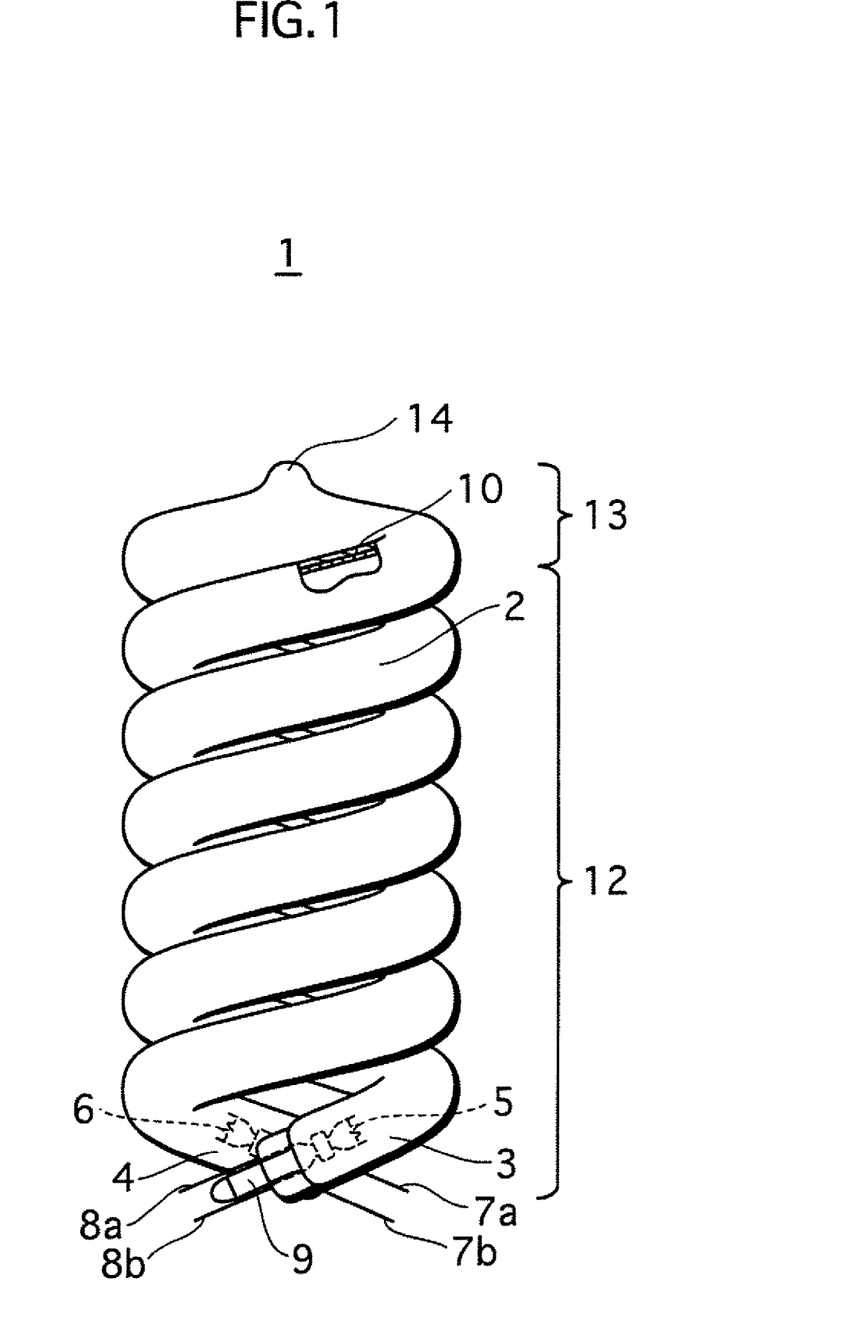
FIG. 1 shows the structure of an arc tube for an electric bulb type fluorescent lamp in an embodiment of the present invention.
Figure 2:
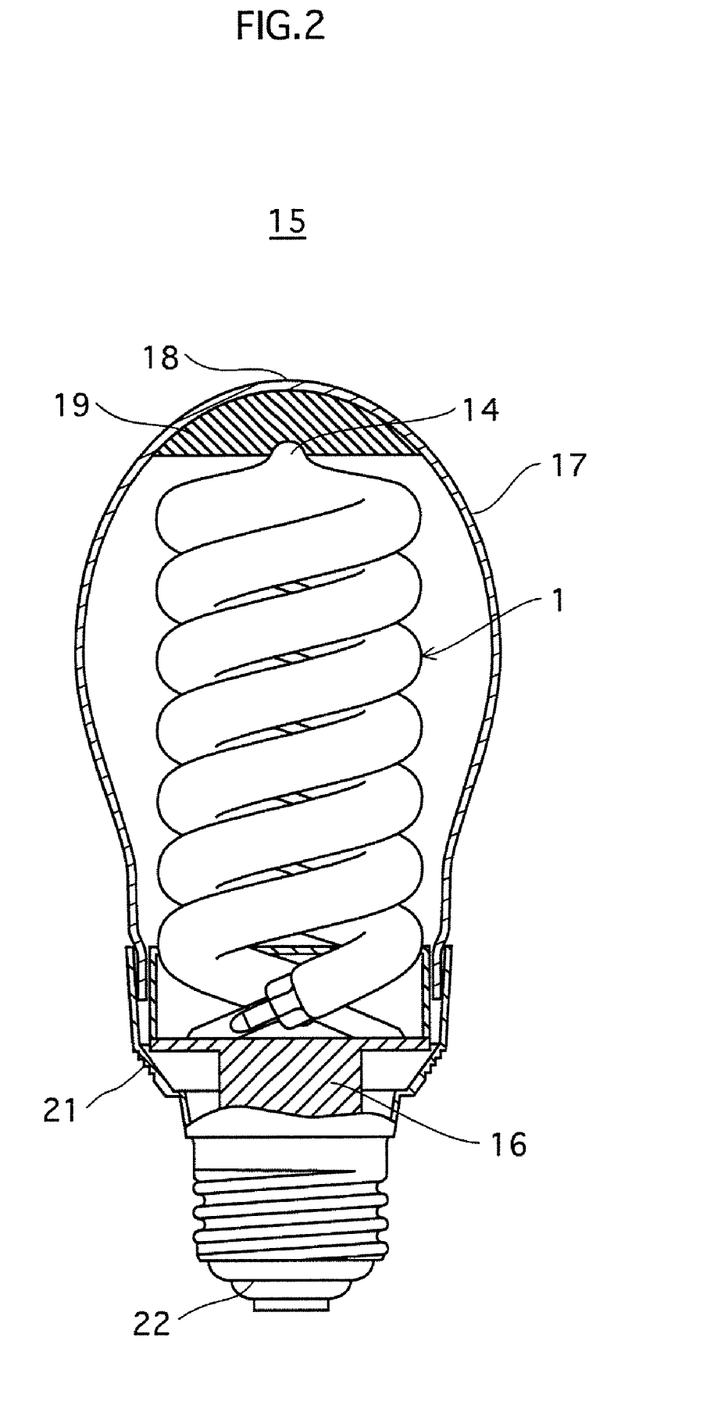
FIG. 2 shows the structure of the electric bulb type fluorescent lamp.

FIG. 1 shows a typical structure of an arc tube for a 22 W electric bulb type fluorescent lamp for replacing a general 100 W electric bulb, in an embodiment of the present invention. FIG. 2 shows an entire structure of the 22 W electric bulb type fluorescent lamp in the embodiment of the present invention.

In an arc tube 1, a glass tube 2 formed as a double spiral glass tube is used as a vessel. A pair of lead wires 7a and 7b, which hold a tungsten coil electrode 5 by the bead glass mount method, are attached hermetically to a tube end portion 3. Also, a pair of lead wires 8a and 8b, which hold a tungsten coil electrode 6 by the bead glass mount method, are attached hermetically to a tube end portion 4. An exhaust pipe 9 is further attached hermetically to the tube end portion 3 (a tip of the exhaust pipe 9 is hermetically sealed after gases are exhausted from the arc tube).

A rare earth phosphor 10 is applied to a major inner surface of the glass tube 2. Approximately 5 mg of mercury and 400 Pa of argon, as a buffer gas, are inserted into the inner space of the tube. Basically, mercury is inserted into the inner space of the tube such that the mercury vapor pressure inside the tube while the lamp is operating is substantially equal to the vapor pressure value of mercury as a simple substance. Accordingly, an amalgam such as zinc-mercury or tin-mercury, which has a mercury vapor pressure close to that of mercury as a simple substance, may be inserted into the inner space of the tube instead of mercury as a simple substance. The glass tube 2 is made of barium strontium silicate glass, which is soft glass and has a softening point of 675° C. The rare earth phosphor 10 is made of a mixture of three phosphors $Y_2O_3$:Eu, $LaPO_4$:Ce,Tb, and $BaMg_2Al_{16}O_{27}$:Eu,Mn for emitting red, green and blue light, respectively.

The glass tube 2 has been formed such that the tube inner diameter of a central portion 13 is greater than the tube inner diameter di of a spiral portion 12. Also, the central portion 13 has a bump 14 at which the coldest point portion Sc is set, where the coldest point portion Sc is to be the coldest point during lighting. A typical structure of the glass tube 2 is set as: tube inner diameter di is 7.2 mm, tube outer diameter do is 9.0 mm, inter-electrode distance Le is 700 mm, and the winding is 6.5-layer winding.

An electric bulb type fluorescent lamp 15 as a final product is produced by forming an assembly of the arc tube 1 with an electronic ballast 16, which is made by a series inverter method and has 91% of a circuit efficiency, housing the assembly in an outer glass bulb 17 and a resin case 21, and attaching an E-shaped base 22 to the resulting assembly.

In the lamp 15, the bump 14, which is in the central portion 13 of the glass tube 2 and at which the coldest point portion Sc is set, is connected to an end portion 18 of the outer glass bulb 17 via a heat-conductive medium 19 made of a transparent silicone resin. A diffusion film has been formed on the inner surface of the outer glass bulb 17 by applying thereto a material whose major ingredient is a powder of calcium carbonate. A typical structure of the lamp 15 is set as: a maximum outer diameter do of the outer glass bulb 17 is 60 mm, and a total length Lo is 137 mm.

With the above-stated structure, the lamp 15 provides excellent lamp characteristics where, for the tube input of 22 W, the luminous flux is 1520 lm and the efficiency is 69.1 lm/W.

<Manufacturing Method>

Figure 3A:
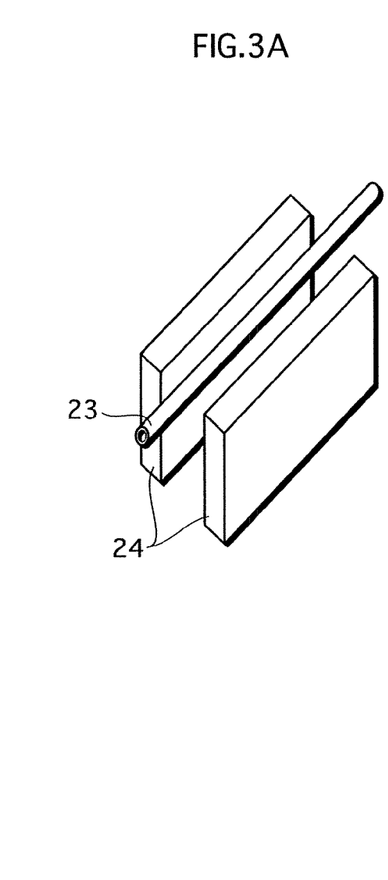
FIGS. 3A through 3C show a manufacturing process of the double spiral glass tube.
Figure 3B:
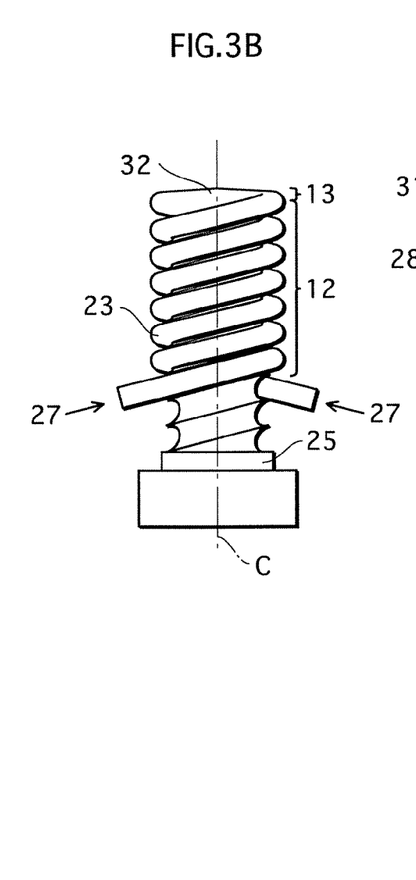
Figure 3C:
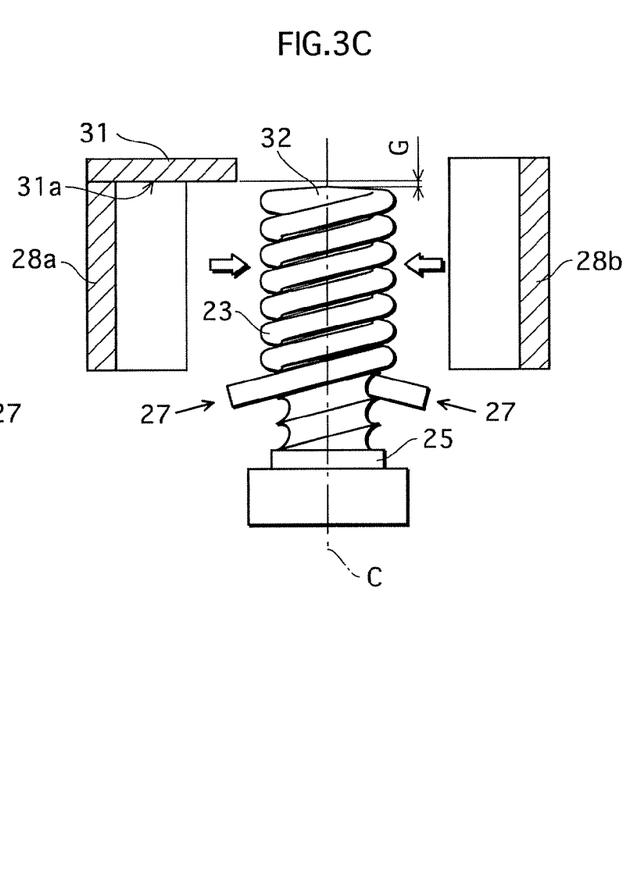
Figure 4A:
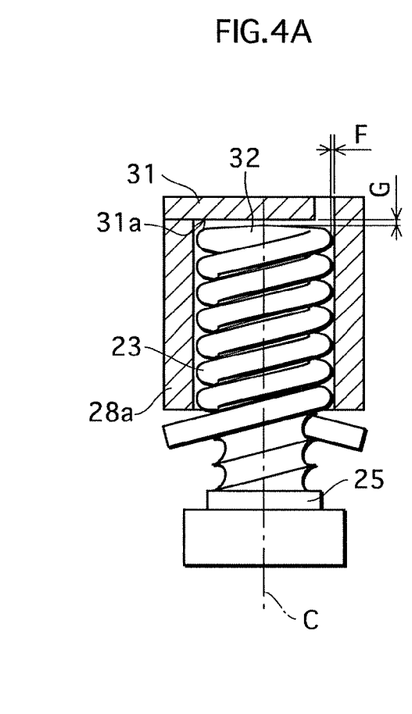
FIGS. 4A through 4D show a manufacturing process of the double spiral glass tube.
Figure 4B:
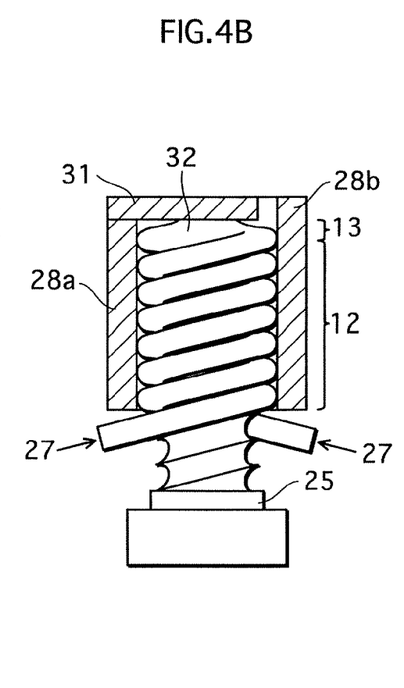
Figure 4C:
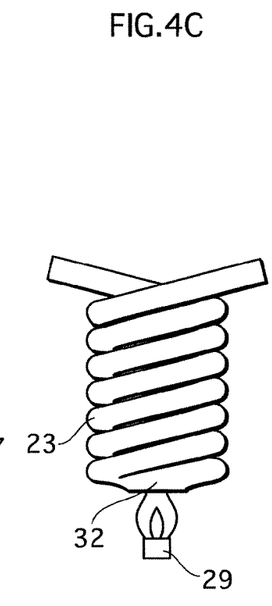
Figure 4D:
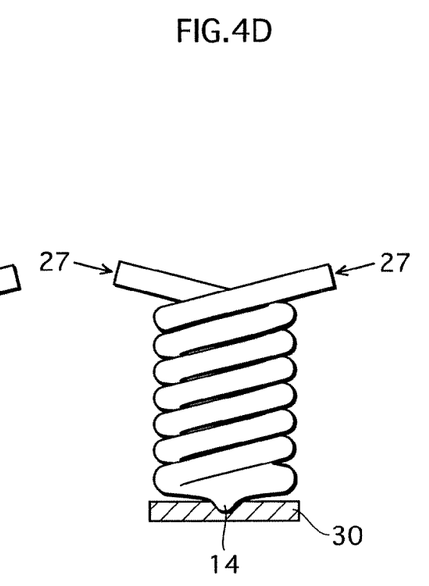
Figure 5:
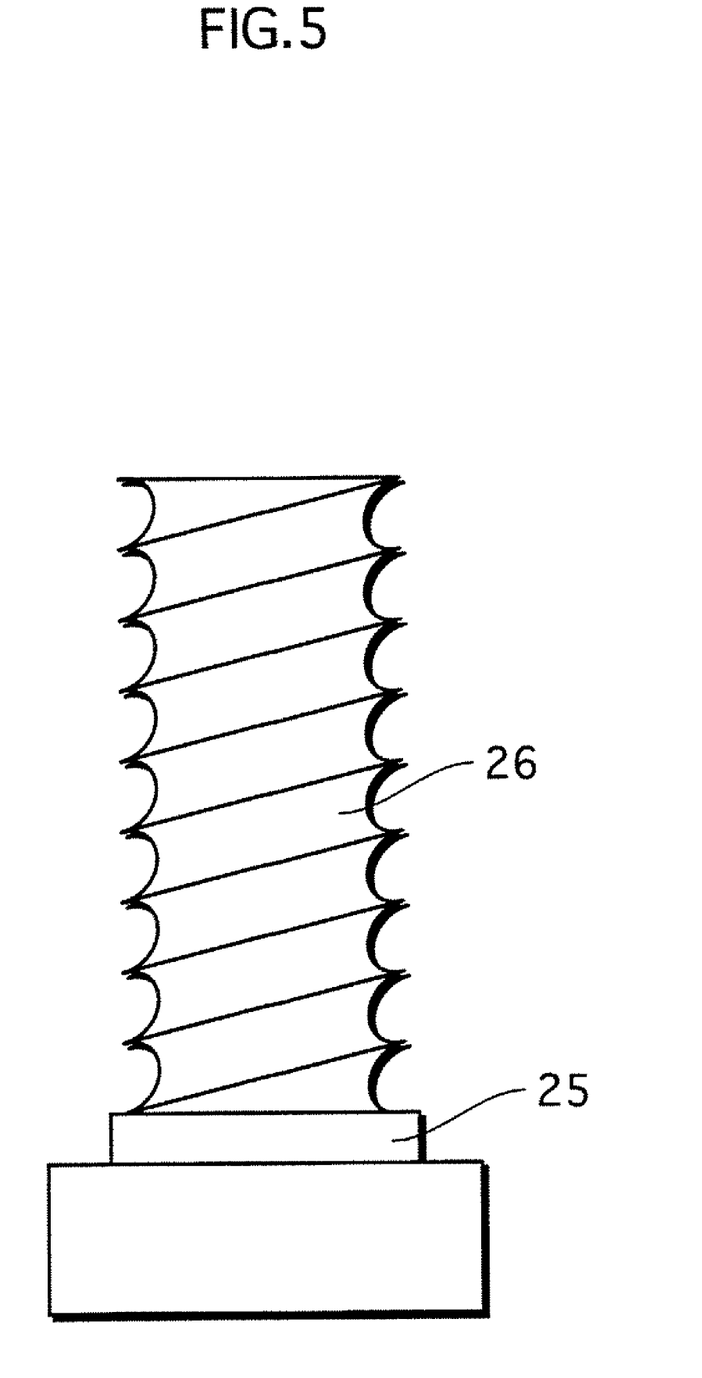
FIG. 5 shows the structure of the processing jig.
Figure 6A:
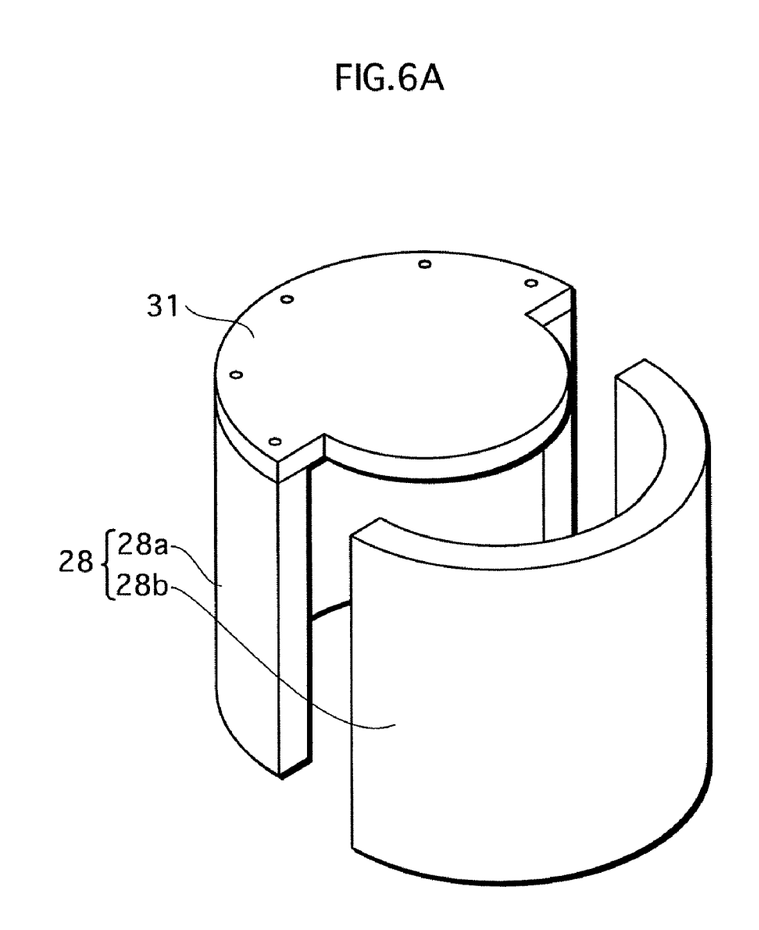
FIG. 6 shows the structure of the processing jig.
Figure 6B:
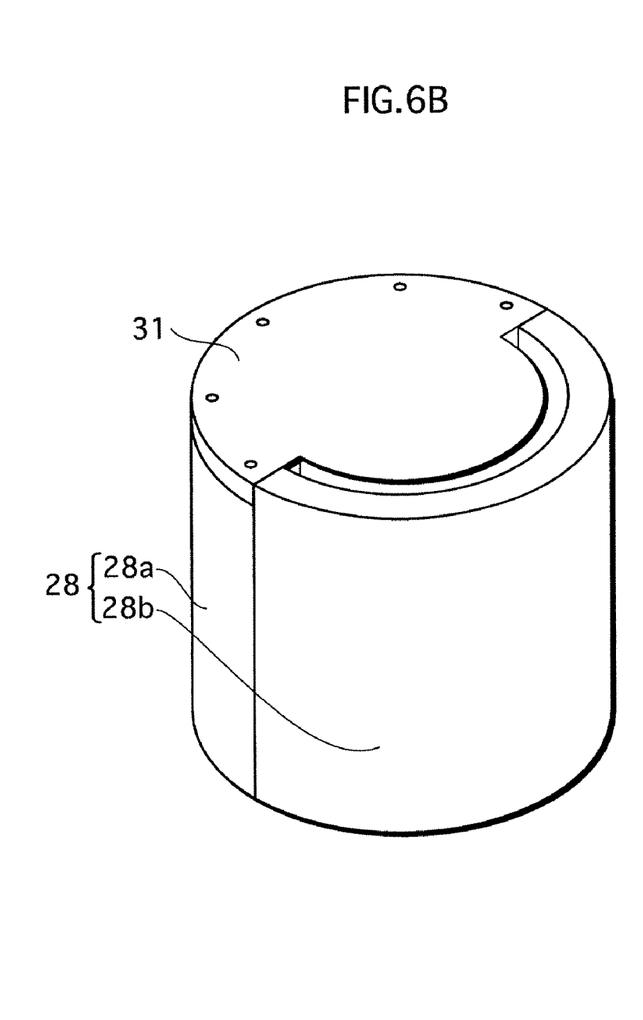

FIGS. 3 and 4 schematically show the forming process of the double spiral glass tube 2. FIGS. 5 and 6 show the structure of the processing jig used in the forming process of the double spiral glass tube 2. The processing jig is composed of a winding jig 25 for winding a glass tube, a shaping jig 28, and an expansion restriction jig 31. The winding jig 25 has a cylindrical column, with a double spiral groove 26 formed along the circumference surface thereof. The shaping jig 28 is made of stainless in a shape of a cylinder. The shaping jig 28 is divided into semicylindrical chassis 28a and 28b by a plane including the central axis of the cylinder. The shaping jig 28 functions to adjust the outer shape of the spiral portion 12. The expansion restriction jig 31 is flat and functions to restrict the expansion of a portion around a bump forming section 32. The expansion restriction jig 31 has a surface 31a with which the bump forming section 32 is contacted, and which is especially flat. The expansion restriction jig 31 is attached to the semicylindrical chassis 28a.

The manufacturing process of the double spiral glass tube 2 includes the following steps (1) to (7). In the following description, the steps (1) to (3) correspond to FIG. 3A to FIG. 3C, respectively, and the steps (4) to (7) correspond to FIG. 4A to FIG. 4D, respectively.

(1) A forming portion of a straight glass tube 23 is heated and softened by an electric heating furnace 24.

(2) The softened straight glass tube 23 is bent at the central portion 13, and two portions of the glass tube 23 extending from the central portion 13 are wound around the winding jig 25 that rotates about a center axis C, so that the glass tube 23 is deformed to have a double spiral shape around the center axis C which is vertical in the drawings. During this step, a nitrogen gas 27 is injected into the inner space of the glass tube 23 from both ends thereof so that the glass tube 23 is not crushed by its own weight.

(3) The shaping jig 28 and the expansion restriction jig 31 are set. More specifically, the semicylindrical chassis 28a and 28b are moved (horizontally in the drawings) to sandwich the double spiral glass tube 23. The expansion restriction jig 31 has been attached to the semicylindrical chassis 28a, and thus is set at the same time as the shaping jig 28.

(4) When the shaping jig 28 and the expansion restriction jig 31 have been set for the forming process, the expansion restriction jig 31 is at a position where the expansion restriction jig 31 is to contact with the bump forming section 32 when the central portion 13 is expanded (in this example, the expansion restriction jig 31 is placed such that there is a distance G between the expansion restriction jig 31a and the bump forming section 32). Also, the shaping jig 28 is at a position where the shaping jig 28 is to contact with the circumferential surface of the spiral portion 12 when the spiral portion 12 is expanded (in this example, the shaping jig 28 is placed such that there is a distance F between the inner surface of 28 and the circumferential surface of 12).

(5) The spiral portion 12 and the central portion 13 are expanded by injecting a pressure-controlled nitrogen gas 27 into the inner space of the glass tube 23 that has been wound around the winding jig 25. With this expansion, the circumferential portion of the spiral portion 12 is slightly contacted with the shaping jig 28 so that the shape of the spiral portion 12 is adjusted. On the other hand, the bump forming section 32 of the central portion 13 is contacted with the expansion restriction jig 31 so that the expansion is restricted to a predetermined amount. The amount of expansion at the bump forming section 32 is smaller than that at a no bump forming section (namely, a portion excluding the bump forming section 32) of the central portion 13. Furthermore, by contacting with the expansion restriction jig 31, the bump forming section 32 comes to have greater tube thickness than the no bump forming section.

(6) The double spiral glass tube 23 is cooled and then is removed from the winding jig 25 by rotating it in the reversed direction. The bump forming section 32 of the central portion 13 is then heated and softened partially by a gas burner 29.

(7) A pressure-controlled nitrogen gas 27 is injected into the inner space of the glass tube 23, so that the softened bump forming section 32 is expanded into a dent of a forming jig 30 to form the bump 14.

<Specific Example>

FIGS. 7A through 7F show the transition in the tube cross sectional shape of the central portion 13 in the manufacturing process.

Figure 7A:
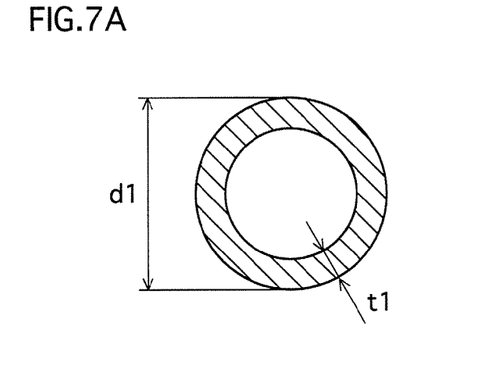
FIGS. 7A through 7F show the transition in the glass tube cross sectional shape in the manufacturing process.
Figure 7B:
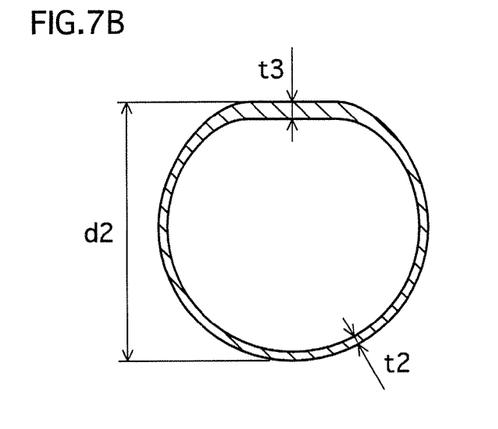
Figure 7C:
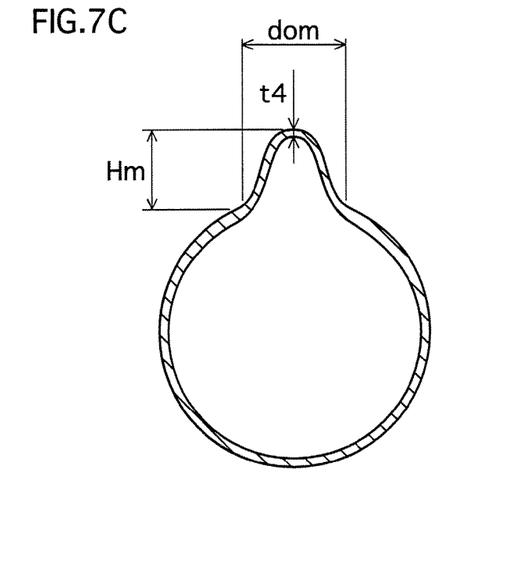
Figure 7D:
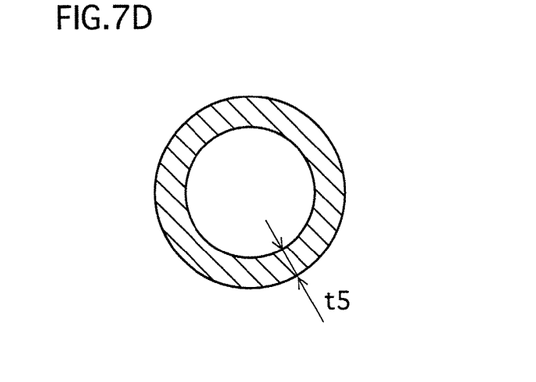
Figure 7E:
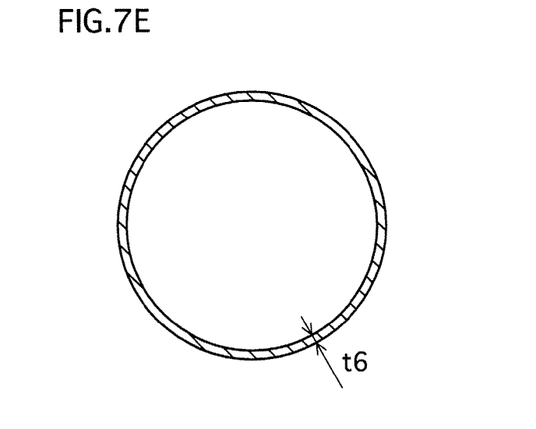
Figure 7F:
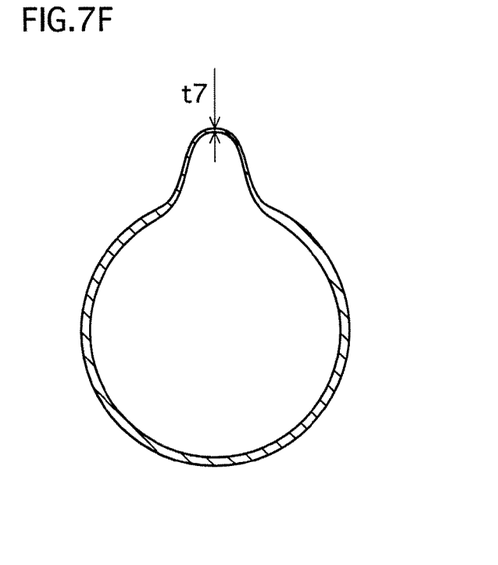

Among these, FIGS. 7A through 7C show cross sections with the manufacturing process of the present invention, and FIGS. 7D through 7F show cross-sections with a conventional manufacturing process.

FIG. 7A shows a cross sectional shape of an unprocessed straight glass tube 23. In the glass tube 23 adopted here, a tube outer diameter d1 is 9.0 mm, and a tube thickness t1 is 0.9 mm. The glass tube 23 has the same measurement as a typical conventionally used glass tube shown in FIG. 7D.

FIG. 7B shows a cross sectional shape after the central portion 13 is expanded until a tube outer diameter d2 becomes approximately 14.5 mm. Here, the expansion restriction jig 31 has been set such that the distance G from the bump forming section 32 is 5.0 mm (with the error of 0.2 mm). As a result of this, the amount of expansion at the bump forming section 32, which is restricted by the expansion restriction jig 31, is smaller than that at the no bump forming section, and the cross sectional shape of the bump forming section 32 becomes partially flat, instead of substantially circular. A thickness t3 of the bump forming section 32 is greater than a thickness t2 of the no bump forming section. Finally, the tube thickness t2 is approximately 0.3 mm, and the tube thickness t3 is approximately 0.6 mm. On the other hand, as shown in FIG. 7E, a tube thickness t6 of the central portion that was expanded by a conventional method is evenly 0.3 mm approximately, whether at the bump forming section or not.

FIG. 7C shows a cross sectional shape after the bump 14 has been formed. The bump 14 has been formed such that a tube outer diameter dom at the base thereof is approximately 7 mm, and a height Hm thereof is approximately 4 mm. A thickness t4 of the bump 14 at its tip is 0.2 mm. With this structure, when the lamp 15 is lighted constantly, the coldest point temperature Tc at the coldest point portion Sc, which has been set to the bump 14, is reduced to an optimum temperature of a vicinity of 60° C. that produces the highest lamp efficiency. On the other hand, as shown in FIG. 7F, the thickness t4 of the tip of the bump formed by a conventional method is as small as 0.05 mm.

As described above, the manufacturing method of the present invention makes it possible to manufacture a glass tube with the bump 14 that has a greater tube thickness than the bump of a glass tube manufactured by a conventional method. This improves the mechanical strength of the bump 14, and makes the bump more difficult to break than conventional ones.

The inventors of the present invention studied the breakage occurrence rate with respect to the bump 14. As a result of the study, it was found that, when the thickness t4 of the bump 14 at its tip is 0.10 mm or greater, the breakage occurrence rate is 0.0% or lower, a level where there is no problem in the actuality. On the other hand, it was found that, when the thickness of the tip of the bump is approximately 0.05 mm as in a glass tube manufactured by a conventional method, the breakage occurrence rate is approximately 3%, which is a serious level. For information, the breakage occurrence rate of 0.01% is a level that has already been achieved conventionally in manufacturing arc tubes, such as U-letter-shaped arc tubes, other than the double spiral glass tubes. Namely, setting the thickness t4 to 0.10 mm or greater makes it possible to decrease the breakage occurrence rate to such a level that has already been achieved conventionally in manufacturing U-letter-shaped arc tubes or the like. It is further preferable to set the thickness t4 to 0.20 mm or greater since this makes it possible to decrease the breakage occurrence rate to 10 ppm or lower, an almost negligible level.

In terms of the lamp characteristics, the bump 14 manufactured by the manufacturing method of the present invention is substantially the same as the bump manufactured by a conventional method. Accordingly, the coldest point temperature Tc at the bump 14 is kept to be at the same level as in the lamps that were mass-produced by a conventional method, while the lamp is lighted. That is to say, the lamp characteristics of the lamp of the present invention are kept to be at the same level as in the conventional lamps.

As described above, the structure of the arc tube and manufacturing method thereof described in the present embodiment can be applied to a fluorescent lamp that includes an arc tube that is composed of the double spiral glass tube 2 in which the central portion 13 has been expanded with the bump 14 formed therein. This especially restricts the bump 14 formed in the central portion 13 from becoming thin, thus restricting the bump from breaking during the lamp manufacturing process or the like.

Up to now, a manufacturing method of a double spiral glass tube, a fluorescent lamp arc tube, and a fluorescent lamp of the present invention have been described through an embodiment thereof. However, the present invention is not limited to the embodiment, but includes, for example, the following modifications.

Figure 8A:
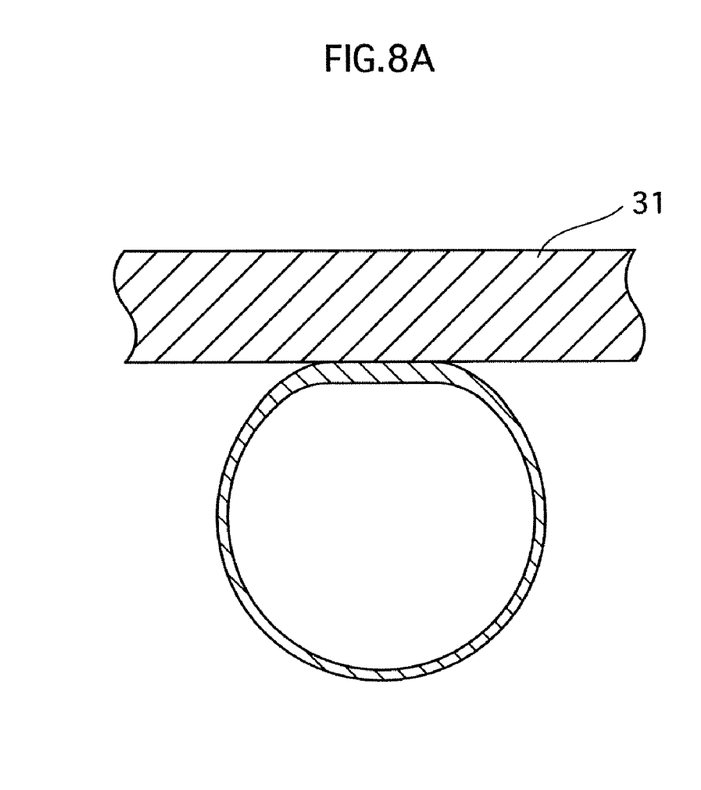
FIGS. 8A and 8B show the structures of processing jigs.
Figure 8B:
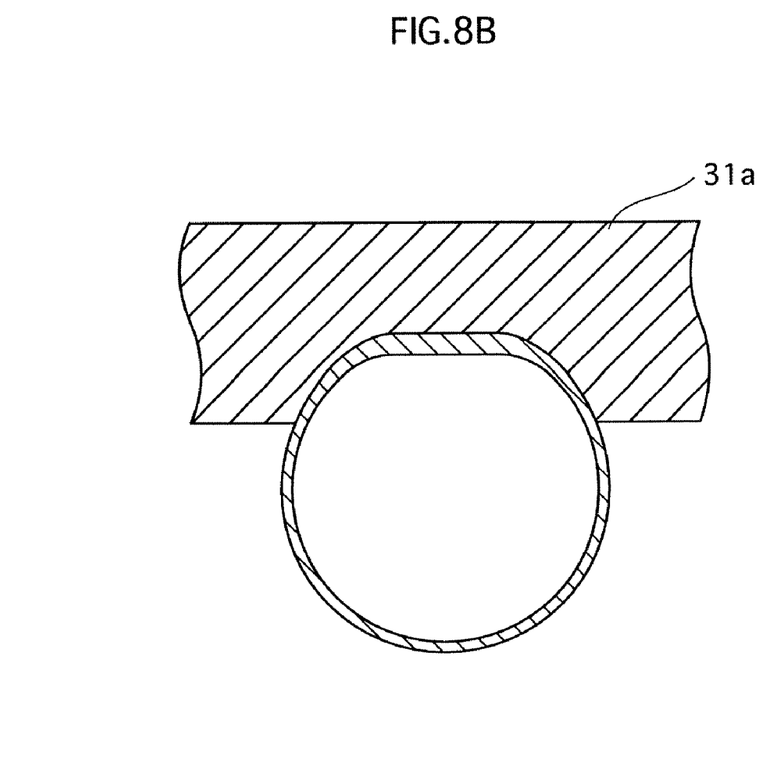

(1) In the embodiment described above, a surface of the expansion restriction jig 31 that is to be contacted with the bump forming section 32 is flat (FIG. 8A). However, not limited to this, in the present invention, the surface of the expansion restriction jig 31 that is to be contacted with the bump forming section 32 may have any shape in so far as it produces an effect of restricting the amount of expansion at the bump forming section 32 to be smaller than that at the no bump forming section in the central portion 13. For example, the surface may have a dent as shown in FIG. 8B.

(2) In the embodiment described above, since the bump forming section 32 is on the spiral axis C of the central portion 13, the surface of the expansion restriction jig 31 that is to be contacted with the bump forming section 32 is set to be perpendicular to the spiral axis C. However, when the bump forming section 32 is placed in another position, the surface of the expansion restriction jig 31 may be set differently from this. For example, the bump 14 is formed to be slant to the spiral axis C, the bump forming section 32 is deviated from the spiral axis C of the central portion 13. In this case, the expansion restriction jig 31 is set to correspondingly face the position of the bump forming section 32.

(3) In the embodiment described above, the expansion restriction jig 31 is used for the purpose of causing the bump forming section 32 to have greater tube thickness than the no bump forming section in the central portion 13. However, any other methods may be used in so far as this purpose is achieved.

Figure 9A:
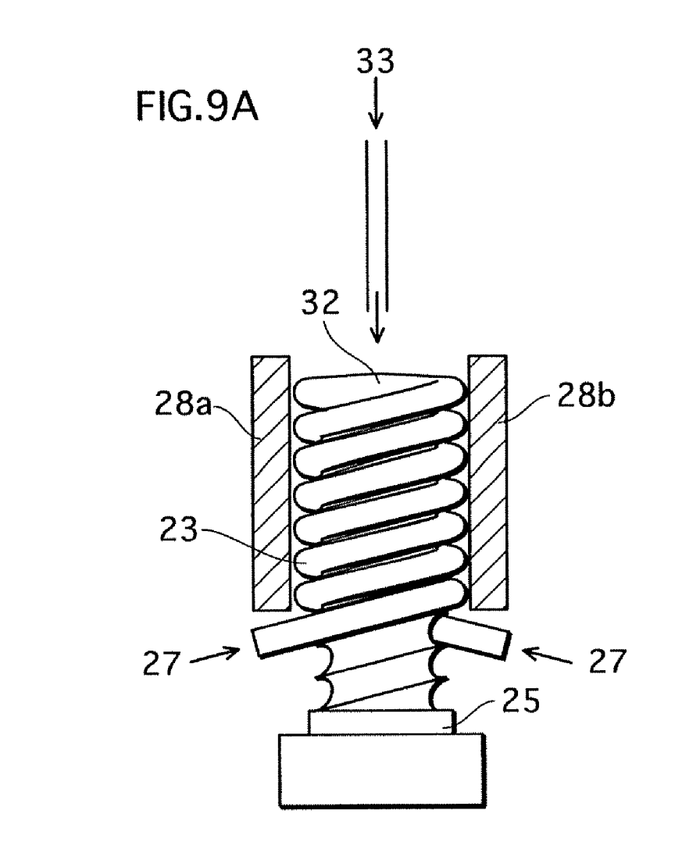
FIGS. 9A and 9B show a manufacturing process of a double spiral glass tube in a modification of the present invention.
Figure 9B:
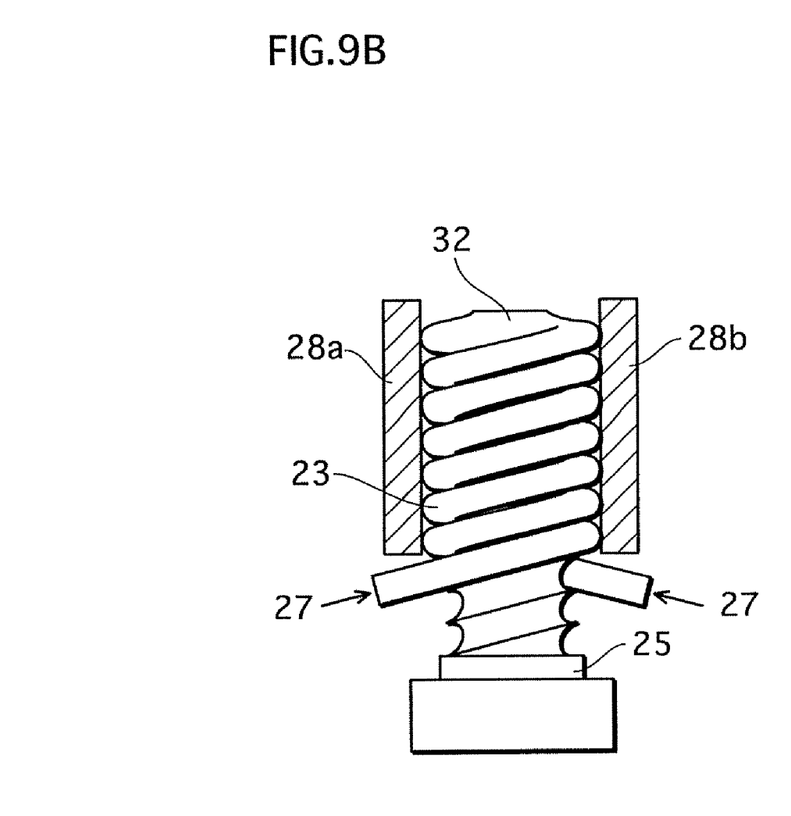

For example, as shown in FIGS. 9A and 9B, a cool gas 33 may be blown onto the bump forming section 32 before the expansion of the central portion 13 is completed. This enables the bump forming section 32 to be cooled partially, making the bump forming section 32 difficult to expand, and as a result of this, the bump forming section 32 comes to have greater tube thickness than the no bump forming section in the central portion 13.

This can also be achieved by a method of causing the central portion 13 to expand, and then pressing the bump forming section with a jig so that the bump forming section has greater tube thickness than the no bump forming section in the central portion 13. The purpose can further be achieved by a method of additionally applying a melted glass to the bump forming section.

Figure 10:
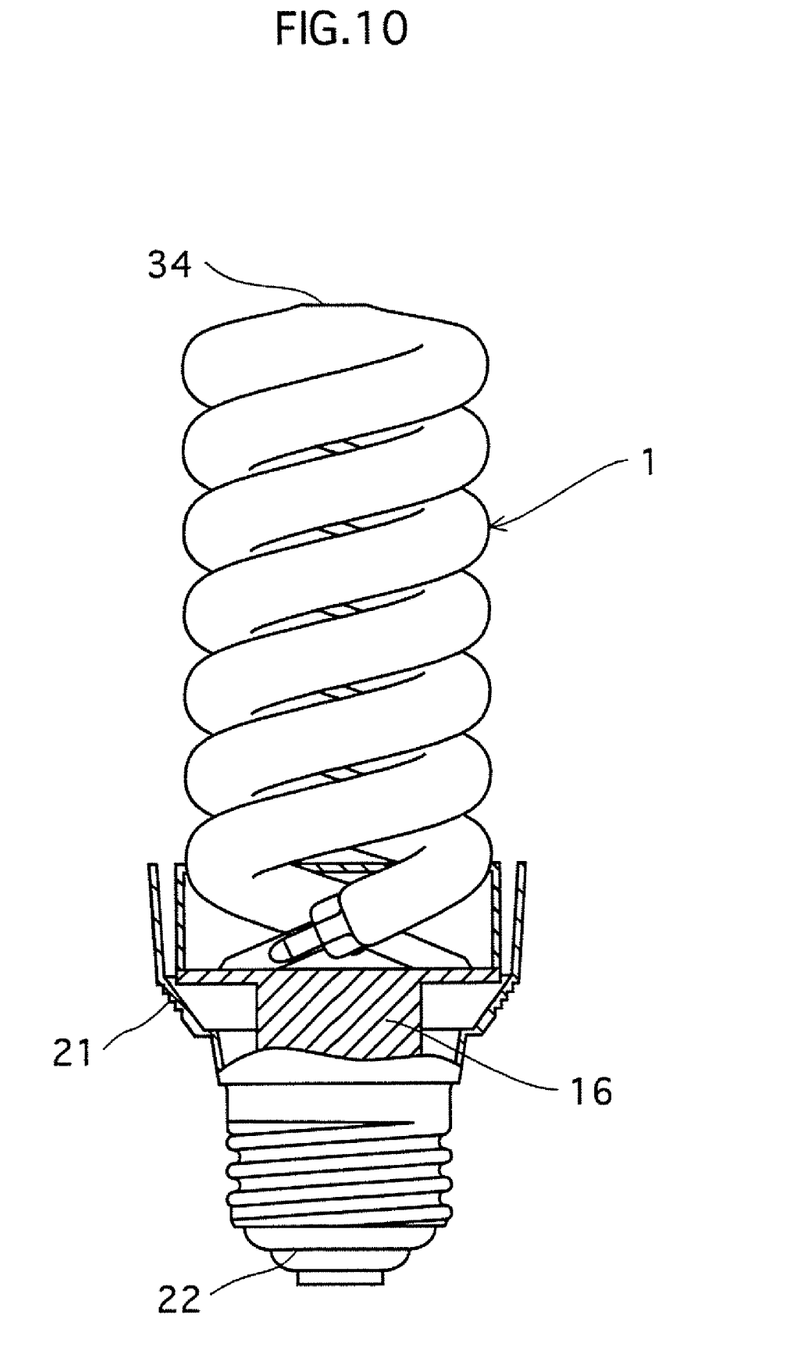
FIG. 10 shows the structure of an electric bulb type fluorescent lamp in a modification of the present invention.

(4) Described in the above embodiment are the double spiral glass tube, the fluorescent lamp arc tube, and the fluorescent lamp that have the bump 14. However, the inventors of the present invention also found a problem in manufacturing an electric bulb type fluorescent lamp to which a conventional double spiral glass tube without a bump is applied. The problem is that a furthest section in the central portion, which is furthest from two ends of the double spiral glass tube in respective straight lines, is easy to break during the manufacturing process. The problem lies in the structure of the lamp as shown in FIG. 10, where the lamp having been assembled using the glass tube does not have the outer glass bulb 17 and the end portion of the lamp becomes a furthest section 34. This structure is weak to shakings or shocks and there is a highest possibility that the end portion of the glass tube is broken when it is shook or dropped during transportation or the like.

To solve this problem, the present invention provides a structure where the glass tube has been formed such that the furthest section 34 in the central portion 13 has a greater tube thickness than the other sections in the central portion 13. With this structure where the furthest section 34 has a greater tube thickness, the mechanical strength of the furthest section 34 is improved, and thus the furthest section 34 is made more difficult to break than conventional ones.

It should be noted here that the double spiral glass tube, where the furthest section 34 in the central portion 13 has a greater tube thickness than the other sections in the central portion 13, can be manufactured by omitting the bump forming step among the steps of the manufacturing process described in the above embodiment. That is to say, the double spiral glass tube of this modification can be manufactured through the steps shown in FIG. 3A through FIG. 4B.

(5) In the above embodiment, description of the double spiral glass tube is provided. However, not limited to this, the present invention can be applied to an arc tube that is composed of three or four bent glass tubes that are in the shape of letter "U". The present invention can also be applied to electric bulb type fluorescent lamps that do not have outer glass bulbs. Further, the present invention can be applied to, for example, the compact type fluorescent lamps, as well as the electric bulb type fluorescent lamps.

INDUSTRIAL APPLICABILITY

The present invention is applicable to fluorescent lamps and the like.

The invention claimed is:
1. A manufacturing method of a double spiral glass tube, comprising:
   a deforming step of softening and bending a straight glass tube at a central portion thereof and deforming the glass tube into a double spiral shape;
   a processing step, following the deforming step, of processing the double spiral shaped glass tube so that a bump forming section in the central portion has a greater tube thickness than other sections in the central portion, the bump forming section being a section at which a bump is to be formed; and
   a forming step, following the processing step, of forming the bump by expanding the bump forming section.

2. The manufacturing method of claim 1, wherein the processing step includes:
   an injecting sub-step of injecting a gas into the double spiral shaped glass tube from an end thereof while the glass tube is in a softened state; and
   an expansion restriction jig setting sub-step of setting an expansion restriction jig in a predetermined position, at which the expansion restriction jig is to be contacted with the bump forming section when the central portion is expanded by the injection of the gas in the injecting sub-step, so that an amount of expansion in the bump forming section is smaller than an amount of expansion in the other sections of the central portion.

3. The manufacturing method of claim 2, wherein a portion of the expansion restriction jig that is to be contacted with the bump forming section is flat.

4. The manufacturing method of claim 2, wherein the processing step further includes:
   a shaping jig setting sub-step of setting a shaping jig that adjusts a shape of a spiral portion excluding the central portion of the double spiral shaped glass tube when the gas is injected in the injecting sub-step.

5. The manufacturing method of claim 4, wherein the expansion restriction jig is attached to the shaping jig.

6. A manufacturing method of an arc tube, comprising:
   a deforming step of softening and bending a straight glass tube at a central portion thereof and deforming the glass tube into a double spiral shape;
   a processing step, following the deforming step, of processing the double spiral shaped glass tube so that a bump forming section in the central portion has a greater tube thickness than other sections in the central portion, the bump forming section being a section at which a bump is to be formed; and
   a forming step, following the processing step, of forming the bump by expanding the bump forming section.

7. The manufacturing method of claim 6, wherein the processing step includes:
   an injecting sub-step of injecting a gas into the double spiral shaped glass tube from an end thereof while the glass tube is in a softened state; and
   an expansion restriction jig setting sub-step of setting an expansion restriction jig in a predetermined position, at which the expansion restriction jig is to be contacted with the bump forming section when the central portion is expanded by the injection of the gas in the injecting sub-step, so that an amount of expansion in the bump forming section is smaller than an amount of expansion in the other sections of the central portion.

8. The manufacturing method of claim 7, wherein a portion of the expansion restriction jig that is to be contacted with the bump forming section is flat.

9. The manufacturing method of claim 7, wherein the processing step further includes:
   a shaping jig setting sub-step of setting a shaping jig that adjusts a shape of a spiral portion excluding the central portion of the double spiral shaped glass tube when the gas is injected in the injecting sub-step.

10. The manufacturing method of claim 9, wherein the expansion restriction jig is attached to the shaping jig.

11. A manufacturing method of a fluorescent lamp, comprising:
    a deforming step of softening and bending a straight glass tube at a central portion thereof and deforming the glass tube into a double spiral shape;
    a processing step, following the deforming step, of processing the double spiral shaped glass tube so that a bump forming section in the central portion has a greater tube thickness than other sections in the central portion, the bump forming section being a section at which a bump is to be formed; and
    a forming step, following the processing step, of forming the bump by expanding the bump forming section.

12. The manufacturing method of claim 11, wherein the processing step includes:
    an injecting sub-step of injecting a gas into the double spiral shaped glass tube from an end thereof while the glass tube is in a softened state; and
    an expansion restriction jig setting sub-step of setting an expansion restriction jig in a predetermined position, at which the expansion restriction jig is to be contacted with the bump forming section when the central portion is expanded by the injection of the gas in the injecting sub-step, so that an amount of expansion in the bump forming section is smaller than an amount of expansion in the other sections of the central portion.

13. The manufacturing method of claim 12, wherein a portion of the expansion restriction jig that is to be contacted with the bump forming section is flat.

14. The manufacturing method of claim 12, wherein the processing step further includes:
    a shaping jig setting sub-step of setting a shaping jig that adjusts a shape of a spiral portion excluding the central portion of the double spiral shaped glass tube when the gas is injected in the injecting sub-step.

15. The manufacturing method of claim 14, wherein the expansion restriction jig is attached to the shaping jig.

* * * * *